United States Patent
Bonzom et al.

(10) Patent No.: US 9,608,371 B2
(45) Date of Patent: Mar. 28, 2017

(54) INTERCONNECTION APPARATUS AND ASSEMBLY COMPRISING SAME

(71) Applicant: Plastic Omnium Advanced Innovation and Research, Brussels (BE)

(72) Inventors: Renaud Bonzom, Brussels (BE); Romain Herdier, Uccle (BE)

(73) Assignee: PLASTIC OMNIUM ADVANCED INNOVATION AND RESEARCH, Brussels (BE)

(*) Notice: Subject to any disclaimer, the term of this patent is extended or adjusted under 35 U.S.C. 154(b) by 0 days.

(21) Appl. No.: 14/917,854

(22) PCT Filed: Sep. 10, 2014

(86) PCT No.: PCT/EP2014/069321
§ 371 (c)(1),
(2) Date: Mar. 9, 2016

(87) PCT Pub. No.: WO2015/036448
PCT Pub. Date: Mar. 19, 2015

(65) Prior Publication Data
US 2016/0226190 A1    Aug. 4, 2016

(30) Foreign Application Priority Data
Sep. 10, 2013    (EP) .................................... 13183686

(51) Int. Cl.
*H01R 13/631*    (2006.01)
*F01N 3/20*    (2006.01)
(Continued)

(52) U.S. Cl.
CPC ....... *H01R 13/6315* (2013.01); *F01N 3/2066* (2013.01); *F01N 13/18* (2013.01);
(Continued)

(58) Field of Classification Search
CPC H01R 13/6315; H01R 12/721; H01R 12/722; H01R 12/724; H01R 12/725;
(Continued)

(56) References Cited

U.S. PATENT DOCUMENTS 4,850,883 A * 7/1989 Kabadi .................. H01R 12/62
439/329
4,997,377 A * 3/1991 Goto ...................... H05K 1/118
439/493

(Continued)

FOREIGN PATENT DOCUMENTS

DE    10 2010 062 982 A1    6/2012
WO    WO 2007/141312 A1    12/2007
WO    WO 2009/007405 A1    1/2009

OTHER PUBLICATIONS

International Search Report and Written Opinion issued Oct. 20, 2014, in PCT/EP2014/069321 filed Sep. 10, 2014.
(Continued)

*Primary Examiner* — Abdullah Riyami
*Assistant Examiner* — Harshad Patel
(74) *Attorney, Agent, or Firm* — Oblon, McClelland, Maier & Neustadt, L.L.P.

(57) ABSTRACT

An interconnection apparatus including: a rigid substrate having a first side and a second side; at least one first connector arranged on the first side; and at least one second connector arranged on the second side. The apparatus can compensate an alignment error of complementary connectors configured to be mated with the at least one first connector and the at least one second connector.

8 Claims, 4 Drawing Sheets

Figure 1:
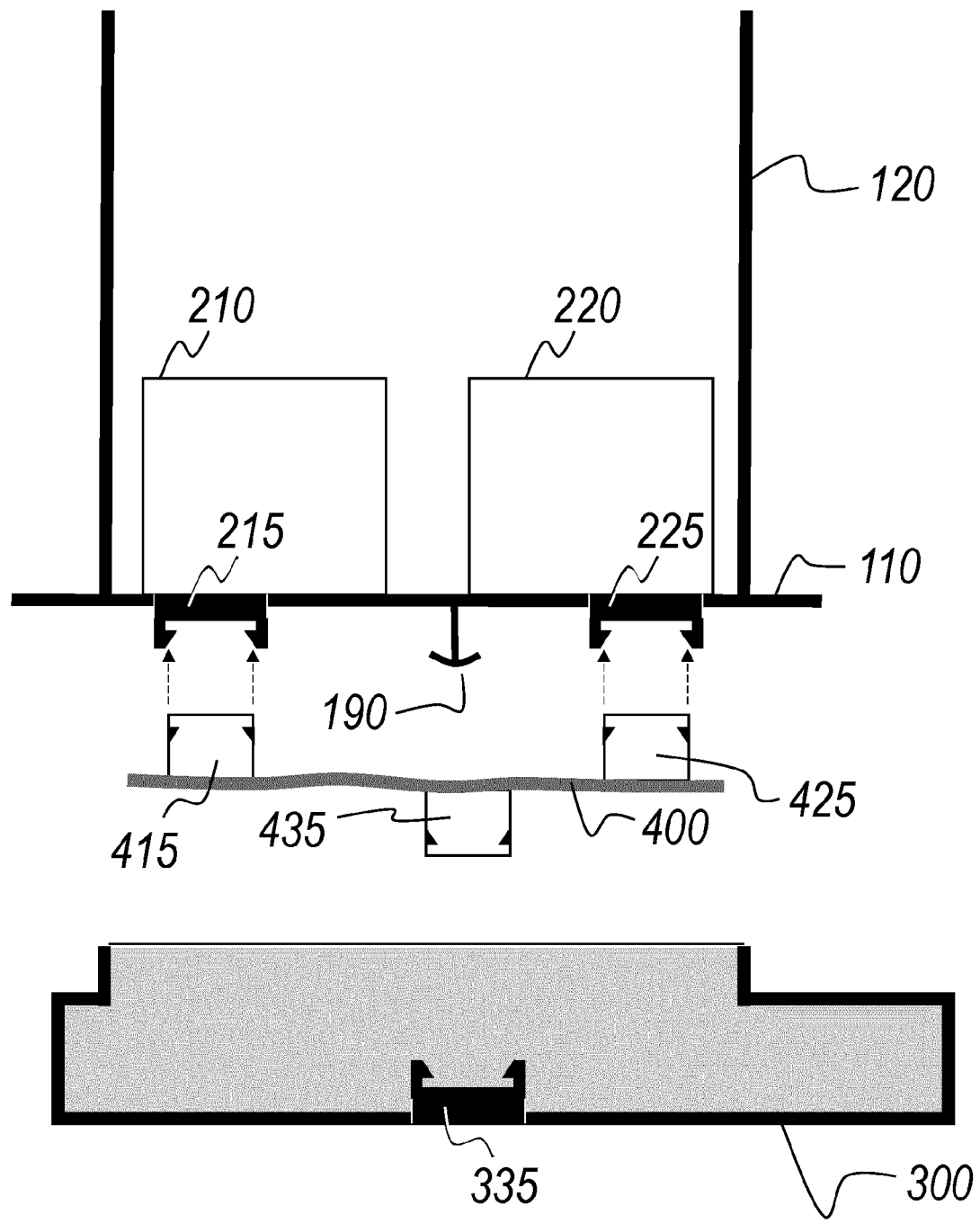

(51) Int. Cl.
*F01N 13/18* (2010.01)
*H01R 13/00* (2006.01)
*H01R 43/26* (2006.01)

(52) U.S. Cl.
CPC ........... *H01R 13/005* (2013.01); *H01R 43/26* (2013.01); *F01N 2450/18* (2013.01); *F01N 2610/1406* (2013.01); *Y02T 10/24* (2013.01)

(58) Field of Classification Search
CPC .... H01R 12/727; H01R 12/728; H01R 12/77; H01R 12/774; H01R 12/772; H01R 12/79
USPC ....... 439/493, 34, 66, 374, 680, 681, 78, 77, 439/633, 636, 637, 640, 653, 654, 67, 68, 439/69, 70, 74; 361/802, 803
See application file for complete search history.

(56) References Cited

U.S. PATENT DOCUMENTS

| | | | | |
|---|---|---|---|---|
| 5,474,458 A * | 12/1995 | Vafi | .................... | H01L 23/49827 257/E23.063 |
| 5,530,623 A * | 6/1996 | Sanwo | .................... | H05K 1/14 361/784 |
| 5,571,021 A * | 11/1996 | Kawabe | ................. | H01R 12/79 439/482 |
| 5,707,242 A * | 1/1998 | Mitra | .................... | H01R 23/688 439/74 |
| 5,768,106 A * | 6/1998 | Ichimura | ................ | H05K 1/144 361/778 |
| 5,781,759 A * | 7/1998 | Kashiwabara | ......... | H01R 12/62 324/756.02 |
| 6,144,559 A * | 11/2000 | Johnson | ............... | G01R 1/0416 174/255 |
| 6,168,459 B1 * | 1/2001 | Cox | ..................... | G11B 5/4846 360/99.18 |
| 6,347,946 B1 * | 2/2002 | Trobough | ........... | G01R 1/0416 361/790 |
| 6,491,543 B1 * | 12/2002 | Yatskov | ............. | H01R 13/2464 439/493 |
| 6,790,075 B1 | 9/2004 | Sung | | |
| 6,971,887 B1 * | 12/2005 | Trobough | ........... | H05K 7/1092 439/71 |
| 7,168,961 B2 * | 1/2007 | Hsieh | ................... | H01R 12/716 361/789 |
| 7,326,092 B2 * | 2/2008 | Fedder | ............... | H01R 12/7005 361/756 |
| 7,394,665 B2 * | 7/2008 | Hamasaki | ................ | G02B 6/43 361/706 |
| 7,667,982 B2 * | 2/2010 | Hamasaki | .............. | H05K 3/222 361/772 |
| 2006/0276061 A1 | 12/2006 | Koguchi et al. | | |
| 2009/0230136 A1 | 9/2009 | Dougnier et al. | | |
| 2010/0175369 A1 | 7/2010 | Op De Beeck et al. | | |
| 2011/0294326 A1 | 12/2011 | Tanaka et al. | | |
| 2013/0263941 A1 | 10/2013 | Landes et al. | | |
| 2014/0079610 A1 | 3/2014 | Op De Beeck et al. | | |
| 2014/0113464 A1 * | 4/2014 | Tran | ................. | H01L 23/49833 439/77 |

OTHER PUBLICATIONS

European Search Report issued Jan. 27, 2014, in European Application 13183686 filed Sep. 10, 2013.

* cited by examiner

INTERCONNECTION APPARATUS AND ASSEMBLY COMPRISING SAME

The present invention pertains to electrical interconnection apparatus, in particular for use in vehicular fluid delivery systems such as systems for selective catalytic reduction of $NO_x$ in the exhaust gas of internal combustion engines.

When two complex parts having multiple electrical connectors have to be coupled, small misalignments of the corresponding connectors of the respective parts can make the coupling more difficult or even impossible. This is of particular concern when the coupling is intended to take place in an automated environment, i.e. by robotic means.

It is an object of embodiments of the present invention to at least partially overcome this problem.

According to an aspect of the present invention, there is provided an interconnection apparatus comprising a rigid substrate having a first side and a second side; at least one first connector arranged on the first side; and at least one second connector arranged on the second side; the apparatus being adapted to compensate an alignment error of complementary connectors intended to be mated with the at least one first connector and the at least one second connector.

By "rigid", it is meant that the substrate cannot be visibly deformed. Thus the shape of the substrate cannot be distorted without the use of excessive force.

In other words, the rigid substrate of the invention cannot be visibly distorted under its own weight.

Numerous materials may be used to construct such rigid substrate, such as polyolefins. For instance HDPE (High Density Polyethylene) is well suited. The substrate can then be manufactured by injection molding.

Therefore ribbon connectors, such as the ones used to connect computers, cannot be a substrate according to the invention, since these ribbons are foldable.

It is an advantage of the present invention that the manufacturing tolerances of the parts to be interconnected can be absorbed by the interconnection apparatus, such that automated assembly can be ensured even in the presence of such tolerances (within certain limits). Moreover, the number of connectors on both sides need not be the same—in other words, the interconnection apparatus can act as an aggregator, combining the signals divided over multiple connectors on one side, into a smaller number of connectors (or even just one) on the other side. This further facilitates the assembly process.

In an embodiment of the interconnection apparatus according to the present invention, the at least one first connector and/or the at least one second connector are mounted onto the rigid substrate in a manner that allows relative movement over a distance of at least 100 micrometer, preferably at least 500 micrometer.

By allowing relative movement between the connectors, connector misalignments can be absorbed without risk of damaging the conductive path of these connectors.

In an embodiment of the interconnection apparatus according to the present invention, the at least one first connector and/or the at least one second connector are provided with guiding means for guiding the complementary connectors into a connecting position. In a particular embodiment, the guiding means comprise chamfered or tapered edges.

By providing guidance to the connector pairs, the connectors of the interconnection apparatus are allowed to move in a continuous manner from their resting position towards a position in which they absorb connector misalignments.

In an embodiment of the interconnection apparatus according to the present invention, electrical connections are provided between terminals of the at least one first connector and terminals of the at least one second connector by means of conductors arranged in or on the rigid substrate.

According to an aspect of the present invention, there is provided an assembly comprising a delivery module for a vehicular fluid tank, an interconnection apparatus as described above, and an electronic control unit, each of the delivery module and the electronic control unit being equipped with at least of one of the complementary connectors, wherein the delivery module is coupled to the interconnection apparatus by means of the at least one first connector, and wherein the electronic control unit is coupled to the interconnection apparatus by means of the at least one second connector.

According to an aspect of the present invention, there is provided a motor vehicle equipped with an assembly as described above.

According to an aspect of the present invention, there is provided a method of assembling an assembly as described above, the method comprising: coupling an interconnection apparatus as described above to the delivery module, by coupling the at least one first connector to the complementary connector provided on the module; and coupling the electronic control unit to the interconnection apparatus by coupling the complementary connector provided on the electronic control unit to the at least one second connector.

In the case of a delivery module for a vehicular fluid tank, such as a urea solution delivery module in a system for selective catalytic reduction (SCR) of $NO_x$ in engine exhaust gases, it is desirable to provide controllers for the active components of the module, for instance in the form of an electronic control unit (ECU), directly below the base plate. It is desirable to achieve interconnection between the delivery module and the controlling logic in an automated environment. The housing of the controlling logic and the module are mechanically aligned by means of guiding elements, such as protrusions and complementary recesses. Due to manufacturing tolerances, a correct mechanical alignment of the parts as such does not necessarily imply perfect alignment of the respective connectors of these parts. Thus, the interconnection apparatus of the present invention is particularly useful in this context.

International patent application publication WO 2007/141312 A1 in the name of the present applicant discloses a system for storing an internal combustion engine exhaust gas liquid additive, the said system comprising a tank for storing the additive and an "immersed" baseplate positioned through an opening made in the bottom wall of the tank, the said baseplate comprising at least one orifice through which a system for injecting the said additive into the exhaust gases can be fed, and also incorporating at least one other active component of the storage system and/or of the injection system. The baseplate may particularly be assembled with the opening in the tank using a ring-nut system screwed onto a thread on the tank side.

International patent application publication WO 2009/007405 A1 in the name of the present applicant discloses a supply system for a liquid comprising a liquid tank, a supply line, a pump, a filter and a device that makes it possible to purge the line, pump and filter and that comprises a non-return device preventing liquid from entering into these elements once they have been purged. In this system, the pump, filter and non-return device are combined in a compact module, the filter at least partly surrounding the pump and the non-return device being an integral part of a common housing that surrounds the filter and at least one part of the pump. The tank may be equipped with a base plate or mounting plate which is a flattened part intended to block off an opening in its lower wall. This base plate may integrate the pump/filter/non-return device module. This is understood to mean that this module is either attached to this base plate or produced at least partly from one piece with this base plate.

It is a disadvantage of the ring-nut system that it constrains the spatial extent of any components that are pre-assembled on the bottom side (i.e., the side facing outwards from the tank) of the flange (hereinafter collectively referred to as the "cover"). This constraint is present because the ring has to be able to pass over the preassembled structure in order to reach its counterpart on the tank (i.e., the thread on surrounding the opening in the tank).

In an embodiment of the method according to the present invention, the module is supported by a base plate suitable for being sealingly mounted onto an opening of a vehicular fluid tank, and the electronic control unit is comprised in an external sub-assembly, the method including attaching the external sub-assembly to the base plate with a mounting ring interposed between them, the attaching takes place while the base plate is not mounted onto the opening of the tank, and the size and shape of the external sub-assembly and the base plate prohibit the mounting ring from being removed from between the external sub-assembly and the base plate after the attaching.

This embodiment is based inter alia on the insight of the inventor that the geometric constraints resting on the external sub-assembly due to the fact that the mounting ring must be able to pass over it afterwards, can be avoided by preassembling the base plate and the external sub-assembly with the mounting ring in between.

It is a further advantage of this method that the leak-tightness and/or electrical connectivity of the assembly can be tested before the assembly is mounted onto a vehicle.

The vehicular fluid tank may be a tank for a reducing agent used in selective catalytic reduction of engine exhaust gases. In particular, the vehicular fluid tank may be a tank for an aquous urea solution (such as the solutions commercially available under the trademarks AdBlue and Denoxium). Alternatively, the vehicular fluid tank may be a fuel tank. Still alternatively, the vehicular fluid tank may be a tank for storing liquids such as coolant, windscreen washer fluid, or oil.

Figure 2:
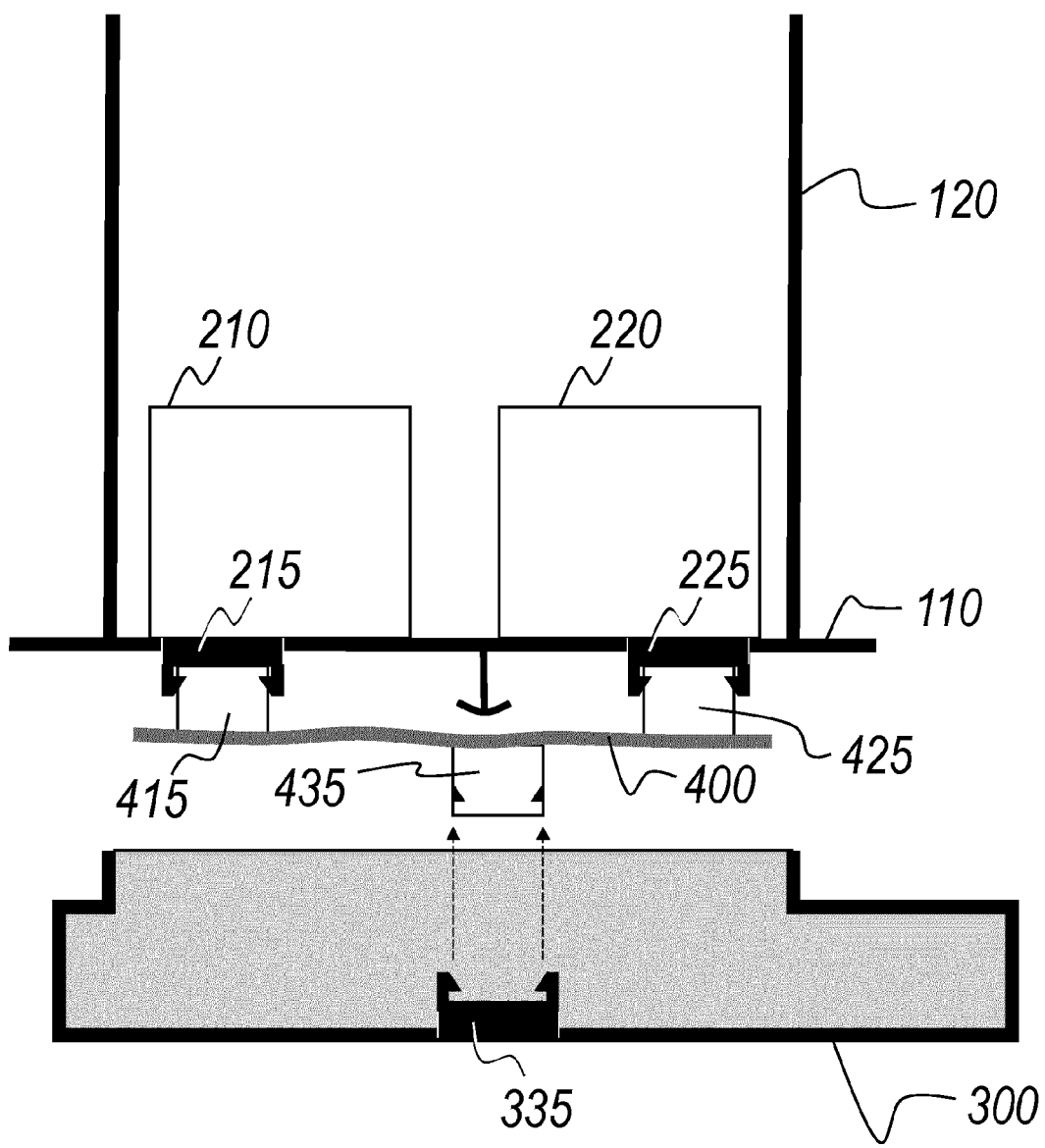
Figure 3:
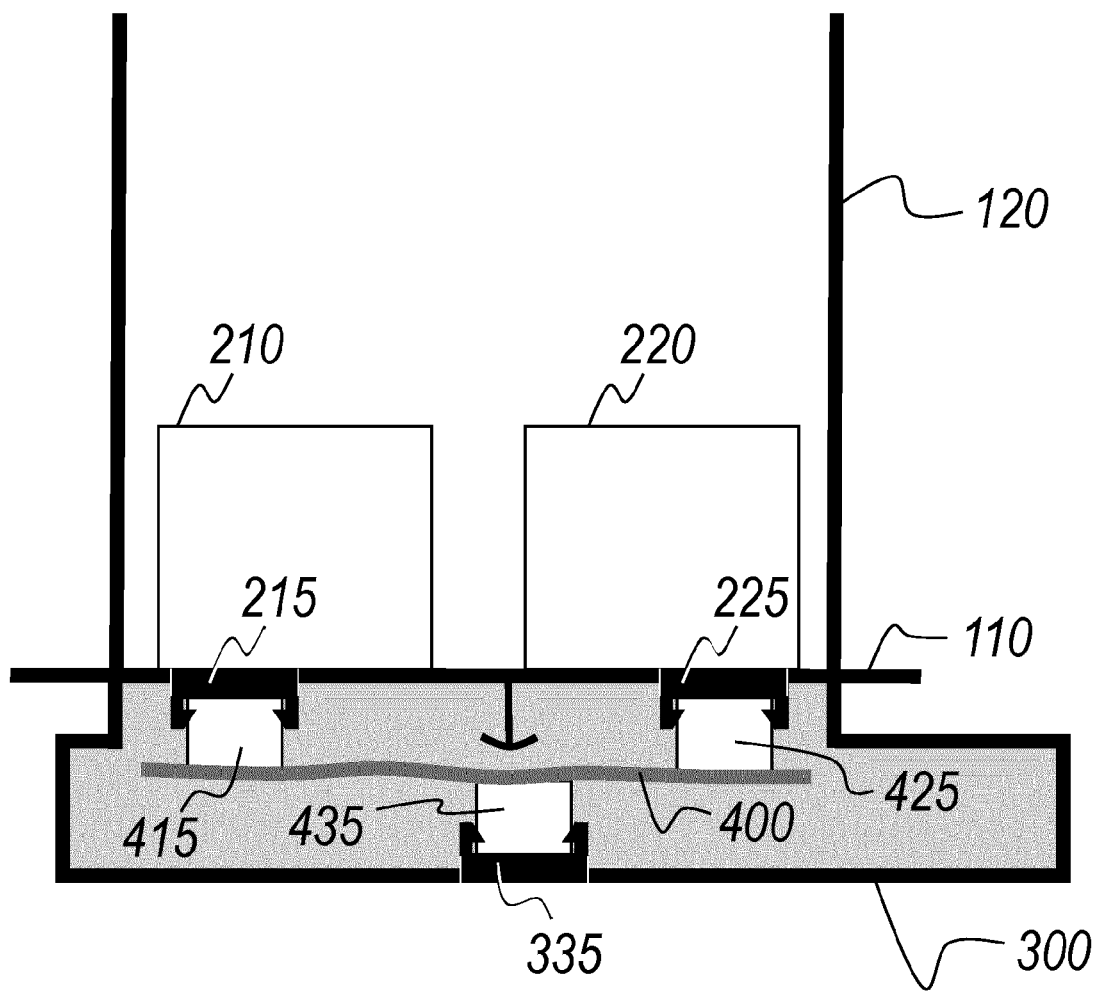
Figure 4:
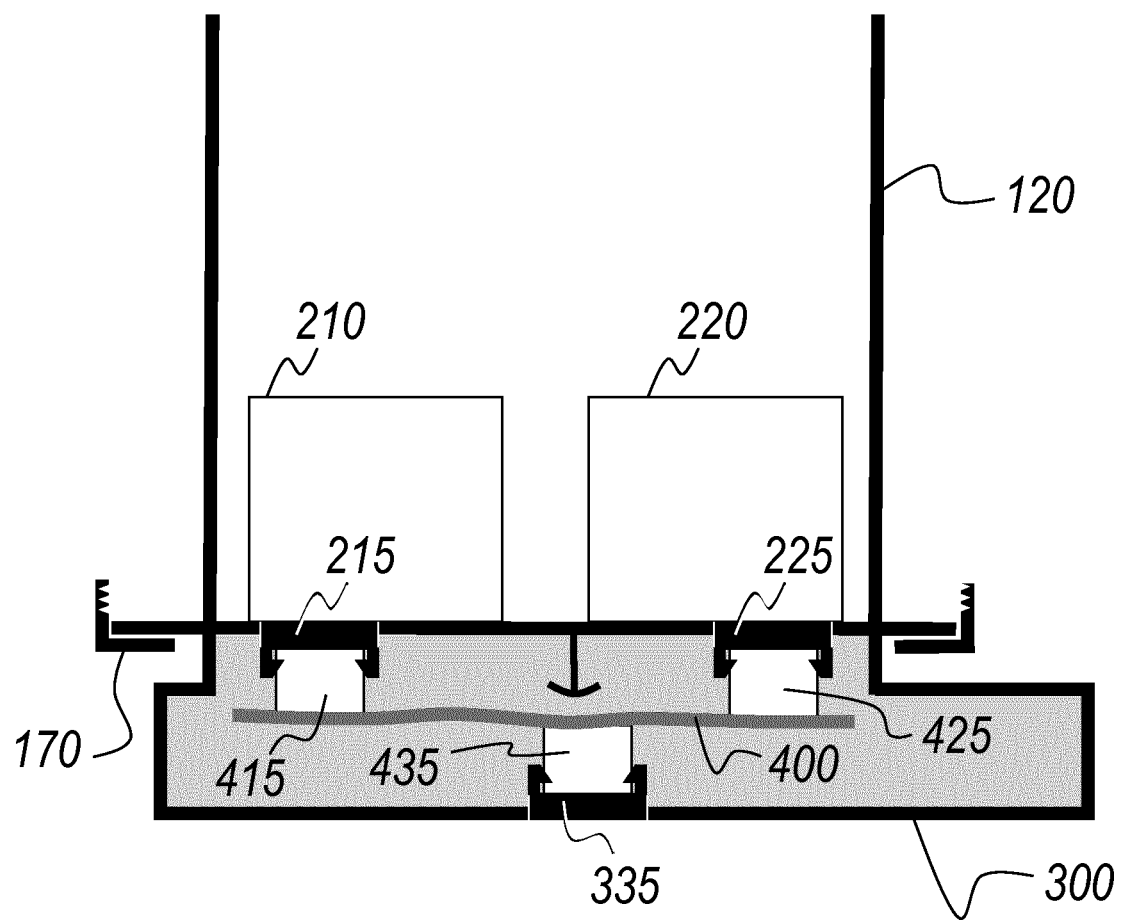

These and other aspects and advantages of the present invention will now be described in more detail with reference to the accompanying drawings, in which:

FIG. 1 schematically represents an interconnection apparatus according to an embodiment of the present invention, prior to coupling to a vehicular fluid delivery module and an external sub-assembly;

FIG. 2 schematically represents the interconnection apparatus of FIG. 1, coupled to the vehicular fluid delivery module, but prior to coupling to the external sub-assembly;

FIG. 3 schematically represents the interconnection apparatus of FIG. 1, coupled to the vehicular fluid delivery module and the external sub-assembly; and FIG. 4 schematically represents a variant of the assembly of FIG. 3, wherein a coupling ring is interposed between the base plate of the delivery module and the external sub-assembly.

FIGS. 1-4 are not drawn to scale, and are only intended to schematically illustrate the interaction of the relevant components. For reasons of clarity, no hydraulic components are shown in the figures. Although various components will be understood to be sealingly attached to each other, the actual seals are not shown to keep the drawings clear. The skilled person will know where and how to apply conventional seals such as O-rings to obtain the required degree of sealing.

FIG. 1 represents a module consisting of a base plate 110 and a swirl pot 120 integrally moulded with the base plate 110. For reasons of clarity and without loss of generality, just two generic internal components of the module are schematically represented by components 210 and 220. Reference is made to WO 2009/007405 for a detailed description of a known module. Fluid communication between the inside and the outside of the tank is achieved by means of tubes passing through the base plate 110 (not shown).

The base plate 110 is sometimes referred to in the art as the "flange".

Module components 210 and 220 have respective connectors 215 and 225 protruding on the other side of the base plate 110.

The interconnection apparatus comprises a rigid substrate 400 having a first side and a second side; at least one first connector 415, 425 arranged on the first side; and at least one second connector 435 arranged on the second side. The apparatus is adapted to compensate an alignment error of the complementary connectors intended to be mated with said at least one first connector 415, 425 and said at least one second connector 435. In the illustrated case, the complementary connectors are the connectors 215, 225 of the module; and the connector 335 of the external sub-assembly 300.

The external sub-assembly 300 may take the form of one or more discrete components, or a number of such components pre-arranged in a housing (as illustrated). As the external sub-assembly 300 sometimes consist of a housing with pre-arranged components, which is mounted to cover the base plate, it is sometimes simply referred to in the art as a "cover". The external sub-assembly 200 may include tubing that connects to a tube or nipple that passes through the base plate 110 (not shown). The external sub-assembly 300 is "external" in the sense that it comprises components that will reside outside the fluid containing volume of the vehicular fluid tank, after mounting of the assembly.

Without loss of generality, the external sub-assembly 300 of the drawings will be considered to substantially consist of an electronic control unit. The relevant components are considered to be present in the shaded area, without being shown in detail.

Without loss of generality, two first connectors 415, 425 and one second connector 435 are shown.

Electrical connections between terminals of the at least one first connector 415, 425 and terminals of the at least one second connector 435 may be provided by means of conductors arranged in or on said substrate 400 (not shown).

The substrate 400 may comprise a material that has appropriate thermal properties. In particular, the inventors have found that it may generally be desirable to conduct heat between components of the external sub-assembly and the contents of the vehicular fluid tank. For example, heat from an ECU could accelerate the process of thawing any frozen urea solution that may be present in the tank. Thus, it may be advantageous to include a material with good thermal conductivity in the substrate 400.

Preferably, the at least one first connector 415, 425 and/or the at least one second connector 435 are mounted onto the substrate 400 in a manner that allows a certain amount of relative movement. This avoids mechanical stresses in the connectors from being caused by initial misalignment of these connectors. Preferably, the possible relative movement extends over a distance of at least 100 micrometer, more preferably at least 500 micrometer.

It can be seen in the figures that the connectors 415, 425, 435 of the interconnection apparatus are provided with chamfered edges, which serve as guiding means for guiding the complementary connectors 215, 225; 335 into a connecting position during the coupling process.

Spacers, such as the exemplary spacer 190 shown in FIG. 1 may be used to limit the deformation of the substrate 400 during the assembly process. They may be provided on the interconnection apparatus (not shown) or on the respective parts to be interconnected. The illustrated spacer 190 is placed such as to avoid excessive deformation of the substrate 400 during coupling of the external sub-assembly 300, which will place a certain amount of pressure on the second connector 435.

Dashed arrows indicate the way in which the interconnection apparatus can be coupled with the module, by mating the first connectors 415, 425 of the interconnection apparatus with the complementary connectors 215, 225 of the module. At this point, there may be a certain misalignment between the connectors of the interconnection apparatus and their counterparts on the module, due to manufacturing tolerances of the module (this misalignment is not shown).

In FIG. 2, the interconnection apparatus has been coupled with the module; i.e., the first connectors 415, 425 of the interconnection apparatus have been coupled with the complementary connectors 215, 225 of the module. The interconnection apparatus (in particular, the substrate 400) has absorbed any misalignment between the complementary connectors 215, 225 and their intended ideal positions.

Dashed arrows indicate the way in which the interconnection apparatus can be coupled with the external sub-assembly, by mating the second connector 435 of the interconnection apparatus with the complementary connectors 335 of the external sub-assembly. At this point, there may be a certain misalignment between the connector of the interconnection apparatus and its counterpart on the external sub-assembly, due to manufacturing tolerances of the external sub-assembly (this misalignment is not shown).

In FIG. 3, the interconnection apparatus has further been coupled with the external sub-assembly 300; i.e., the second connector 435 of the interconnection apparatus has been coupled with the complementary connector 315 of the external sub-assembly 300. Again, the interconnection apparatus has absorbed any misalignment between the complementary connector 435 and its intended ideal position.

Thus is formed an assembly according to an embodiment of the present invention, which can be mounted on a vehicular fluid tank, in particular in an SCR system of a motor vehicle.

FIG. 4 shows a variant of the assembly of FIG. 3, which is further equipped with a mounting ring 170.

The module of FIG. 4 may be attached to a tank wall (not shown) which has an opening with a mounting feature (not shown), in particular a thread or a cam lock. Attachment of the module takes place by arranging the base plate 110 over an opening in a tank wall, and securing a mounting ring 170 of the mason jar ring type over the based plate 110 so as to engage with the tank's thread. Alternatively, the mounting ring may be a component of a cam lock.

Thus, a particular method of assembling an assembly according to an embodiment of the present invention includes attaching the external sub-assembly 300 to the base plate 110 with a mounting ring 170 interposed between them. The attaching takes place while the base plate 110 is not mounted to an opening of the tank. The size and shape of said external sub-assembly 300 and the base plate 110 prohibit the mounting ring 170 from being removed from between the external sub-assembly 300 and the base plate 110 after the attaching.

While the invention has been described hereinabove with reference to separate system and method embodiments, this was done for clarifying purposes only. The skilled person will appreciate that features described in connection with the system or the method alone, can also be applied to the method or the system, respectively, with the same technical effects and advantages. Furthermore, the scope of the invention is not limited to these embodiments, but is defined by the accompanying claims.

According to one variant of the invention, substrate 400 is substantially planar, and the second side is opposite to the first side of the substrate 400.

Alternatively, substrate 400 is not planar, and the second side makes a non-zero angle with the first side. The second side may be opposite to the first side, in which case that angle is 180°.

The invention claimed is:

1. An assembly comprising:
    a delivery module for a vehicular fluid tank;
    an interconnection apparatus; and
    an electronic control unit;
    the interconnection apparatus comprising:
        a rigid substrate having a first side and a second side;
        at least one first connector arranged on the first side; and
        at least one second connector arranged on the second side;
        the interconnection apparatus configured to compensate an alignment error of complementary connectors configured to be mated with the at least one first connector and the at least one second connector;
    each of the delivery module and the electronic control unit including at least of one of the complementary connectors;
    wherein the delivery module is coupled to the interconnection apparatus by the at least one first connector, and wherein the electronic control unit is coupled to the interconnection apparatus by the at least one second connector.

2. The assembly according to claim 1, wherein the at least one first connector and/or the at least one second connector are mounted onto the rigid substrate to allow relative movement over a distance of at least 100 micrometer.

3. The assembly according to claim 1, wherein the at least one first connector and/or the at least one second connector include guiding means for guiding the complementary connectors into a connecting position.

4. The assembly according to claim 3, wherein the guiding means comprises chamfered or tapered edges.

5. The assembly according to claim 1, wherein electrical connections are provided between terminals of the at least one first connector and terminals of the at least one second connector by conductors arranged in or on the rigid substrate.

6. A motor vehicle comprising an assembly according to claim 1.

7. A method of assembling an assembly according to claim 1, the method comprising:
    coupling an interconnection apparatus according to claim 1 to the delivery module, by coupling the at least one first connector to the complementary connector provided on the delivery module; and coupling the electronic control unit to the interconnection apparatus by coupling the complementary connector provided on the electronic control unit to the at least one second connector.

8. The method according to claim 7, wherein the delivery module is supported by a base plate configured to be sealingly mounted onto an opening of a vehicular fluid tank, and wherein the electronic control unit is comprised in an external sub-assembly, the method further comprising:
attaching the external sub-assembly to the base plate with a mounting ring interposed between them,
wherein the attaching takes place while the base plate is not mounted onto the opening of the tank, and
wherein size and shape of the external sub-assembly and the base plate prohibit the mounting ring from being removed from between the external sub-assembly and the base plate after the attaching.

\* \* \* \* \*